(12) United States Patent
Yang et al.

(10) Patent No.: US 12,395,071 B2
(45) Date of Patent: Aug. 19, 2025

(54) POWER CONVERTER AND METHOD OF OPERATING THE SAME

(71) Applicant: DELTA ELECTRONICS, INC., Taoyuan (TW)

(72) Inventors: Shang-Kay Yang, Taoyuan (TW); Hsien-Kai Wang, Taoyuan (TW); Yen-Wei Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 259 days.

(21) Appl. No.: 18/331,341

(22) Filed: Jun. 8, 2023

(65) Prior Publication Data

US 2024/0195291 A1    Jun. 13, 2024

(30) Foreign Application Priority Data

Dec. 13, 2022 (CN) .......................... 202211602820.9

(51) Int. Cl.
*H02M 1/42* (2007.01)
(52) U.S. Cl.
CPC ........ *H02M 1/4208* (2013.01); *H02M 1/4233* (2013.01)
(58) Field of Classification Search
CPC .......................... H02M 1/4208; H02M 1/4233
See application file for complete search history.

(56) References Cited

U.S. PATENT DOCUMENTS

| | | | | |
|---|---|---|---|---|
| 9,735,661 | B2* | 8/2017 | Halim | H02M 1/12 |
| 10,734,887 | B1* | 8/2020 | Halberstadt | H02M 7/217 |
| 10,734,888 | B1* | 8/2020 | Halberstadt | H02M 1/4225 |
| 2013/0257392 | A1* | 10/2013 | Yan | H02M 1/4266 323/210 |
| 2020/0343811 | A1* | 10/2020 | Xiang | H02M 1/12 |
| 2021/0305907 | A1* | 9/2021 | Dong | H02M 1/083 |
| 2021/0313875 | A1* | 10/2021 | Messina | H02M 1/4208 |

* cited by examiner

*Primary Examiner* — Gary A Nash
(74) *Attorney, Agent, or Firm* — MUNCY, GEISSLER, OLDS & LOWE, P.C.

(57) ABSTRACT

A power converter includes a power factor correction (PFC) circuit and a controller. The controller acquires a switching frequency based on an instantaneous value of the input voltage, and acquires an upper limit frequency and a lower limit frequency based on an effective value of an input current. When the controller determines that the effective value is greater than a medium load threshold, an operation mode of the PFC circuit is switched from a critical conduction mode or a triangular current mode to a continuous conduction mode based on the switching frequency being less than the lower limit frequency, and to limit the switching frequency to the lower limit frequency. Furthermore, the controller adjusts the lower limit frequency between a first lower limit frequency and a second lower limit frequency based on the increase or decrease of the effective value.

18 Claims, 9 Drawing Sheets

POWER CONVERTER AND METHOD OF OPERATING THE SAME

BACKGROUND

Technical Field

The present disclosure relates to a power converter and a method of operating the same, and more particularly to a power converter with a switching frequency adjusted based on a load magnitude and a method of operating the same.

Description of Related Art

The statements in this section merely provide background information related to the present disclosure and do not necessarily constitute prior art.

The information industry has developed rapidly in recent years, and power supplies play an important role. The power density and conversion efficiency of information power equipment in the Netcom and server industries are gradually required to be increased under a fixed volume. In order to acquire higher efficiency and high power density, the AC/DC power converter in the front stage of the power supply uses a power factor corrector (PFC) architecture that is gradually being widely used. In particular, the use of a critical conduction mode (CRM) or a triangular current mode (TCM) input current control technology can increase the switching frequency and relatively reduce the volume of the inductor core of the PFC architecture.

Common input current control methods are: TCM, CRM, discontinuous conduction mode (DCM) and continuous conduction mode (CCM). Please refer to FIG. 1A, which shows a waveform diagram of power factor correction of a conventional power converter operating in a critical conduction mode and FIG. 1B, which shows a waveform diagram of power factor correction of a conventional power converter operating in a triangular current mode. TCM and CRM input current control methods also operate at high switching frequencies, and compared with the CCM input current control method, it has the advantage of smaller conduction (turned-on) loss. However, in actual high-power applications, the peak inductor current (i.e., the maximum current) of the power factor corrector operating in the two control methods is about twice as large as the CCM input current control method, and the corresponding power switch must also withstand twice the current stress. For this reason, the conventional technology usually sets the hardware maximum fixed frequency and minimum fixed frequency of the power factor corrector. However, since the power supply needs to be overloaded in special applications, it is easy to cause the inductor current of the power factor corrector to operate at a fixed minimum frequency for a long time, resulting in inductor saturation.

Accordingly, the present disclosure provides a power converter and a method of operating the same to avoid the phenomenon that the power factor corrector is easily saturated due to overload requirements when the power factor corrector operates in TCM and CRM.

SUMMARY

In order to solve the above-mentioned problem, the present disclosure provides a power converter. The power converter receives an input voltage, and provides an output voltage to supply power to a load. The power converter includes a power factor correction circuit and a controller. The power factor correction circuit receives the input voltage, and includes at least one power switch. The controller is coupled to the at least one power switch, and controls the switching of the at least one power switch, and controls the power factor correction circuit converting the input voltage into the output voltage, and controls an input current of the power factor correction circuit to follow the input voltage. The controller acquires a switching frequency and a frequency range based on an instantaneous value of the input voltage and an effective value of the input current. The frequency range includes an upper limit frequency and a lower limit frequency. When the controller determines that the effective value is greater than a medium load threshold, an operation mode of the power factor correction circuit is switched from a critical conduction mode to a continuous conduction mode, and to limit the switching frequency to the lower limit frequency based on the switching frequency being less than the lower limit frequency; or the operation mode is switched from a triangular current mode to the continuous conduction mode, and to limit the switching frequency to the lower limit frequency. When the controller determines that the effective value is greater than the medium load threshold, the controller adjusts the lower limit frequency between a first lower limit frequency and a second lower limit frequency based on the increasing or decreasing of the effective value.

In order to solve the above-mentioned problem, the present disclosure provides a method of operating a power converter. The power converter receives an input voltage and provides an output voltage to supply power to a load. The power converter includes a power factor correction circuit and the power factor correction circuit includes at least one power switch. The method includes steps of: acquiring a switching frequency and a frequency range based on an instantaneous value of the input voltage and an effective value of an input current of the power factor correction circuit, wherein the frequency range comprises an upper limit frequency and a lower limit frequency; determining the switching frequency based on the effective value being greater than a medium load threshold; (a) switching an operation mode of the power factor correction circuit from a critical conduction mode to a continuous conduction mode based on the switching frequency being less than the lower limit frequency, and limiting the switching frequency to the lower limit frequency, or (b) switching the operation mode from a triangular current mode to the continuous conduction mode based on the switching frequency being less than the lower limit frequency, and limiting the switching frequency to the lower limit frequency; increasing the lower limit frequency from a first lower limit frequency to a second lower limit frequency based on the increase of the effective value, and decreasing the lower limit frequency from the second lower limit frequency to the first lower limit frequency based on the decrease of the effective value.

The main purpose and effect of the present disclosure are: when the controller determines that the effective value is higher than the medium load threshold, the operation mode of the power factor correction circuit is switched from CRM or TCM to CCM based on the switching frequency being less than the lower limit frequency, and the switching frequency is limited at the lower limit frequency. Also, the controller increases the lower limit frequency from the first lower limit frequency to the second lower limit frequency based on the increase of the effective value. Therefore, the operation range (load range) may be changed to a wider range, and the inductance saturation phenomenon caused by the long-term operation of the inductor current at a fixed minimum frequency can be avoided, thereby realizing the effect of widening the ZVS load range.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1A:
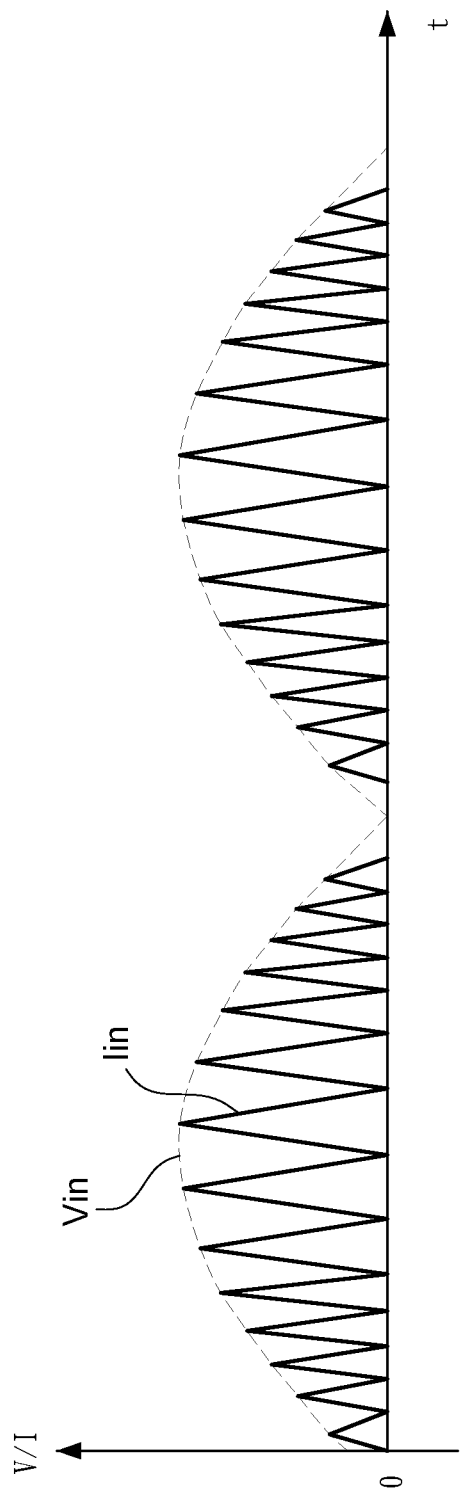
FIG. 1A is a waveform diagram of power factor correction of a conventional power converter operating in a critical conduction mode.

Reference will now be made to the drawing figures to describe the present disclosure in detail. It will be understood that the drawing figures and exemplified embodiments of present disclosure are not limited to the details thereof.

Figure 1B:
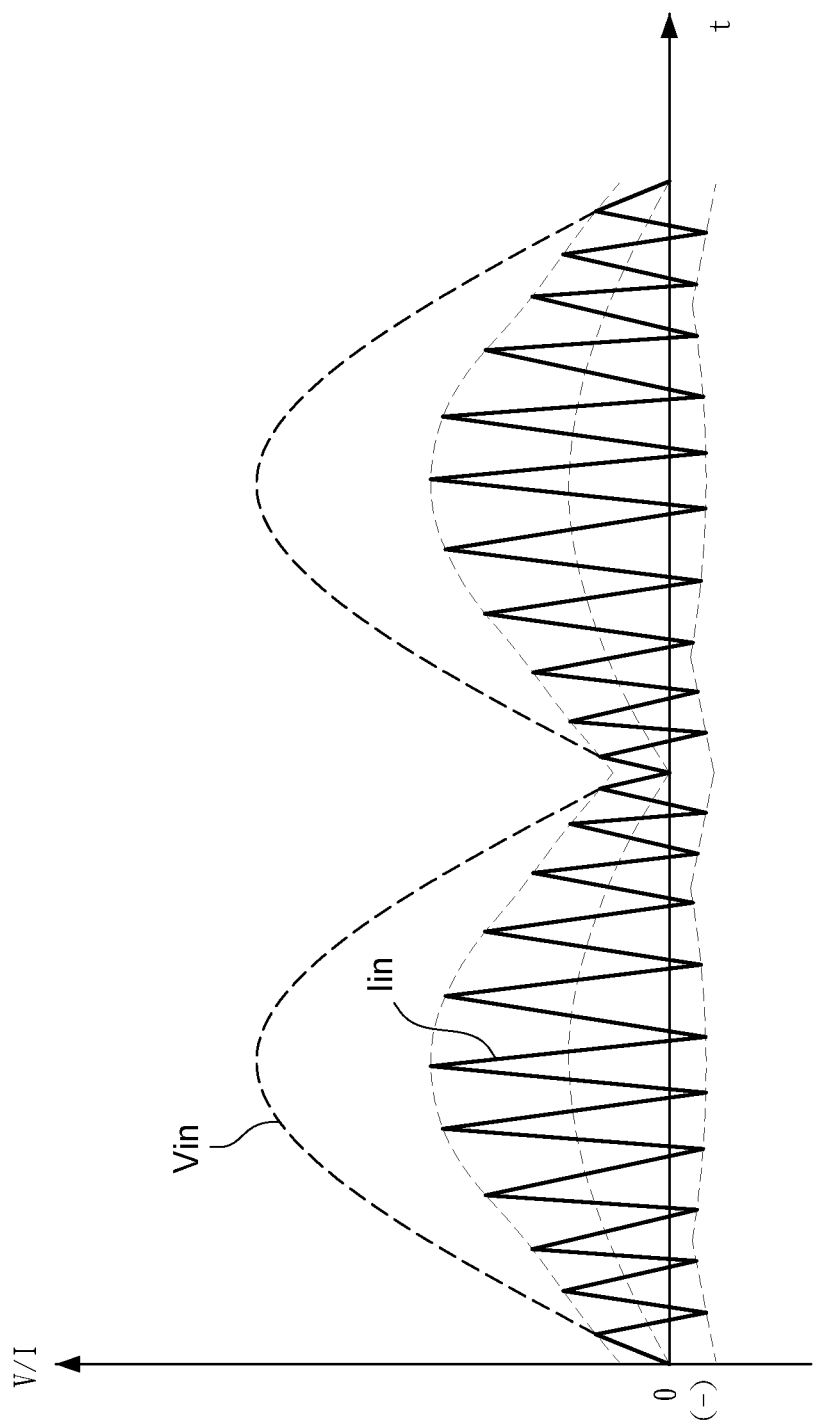
FIG. 1B is a waveform diagram of power factor correction of a conventional power converter operating in a triangular current mode.
Figure 2A:
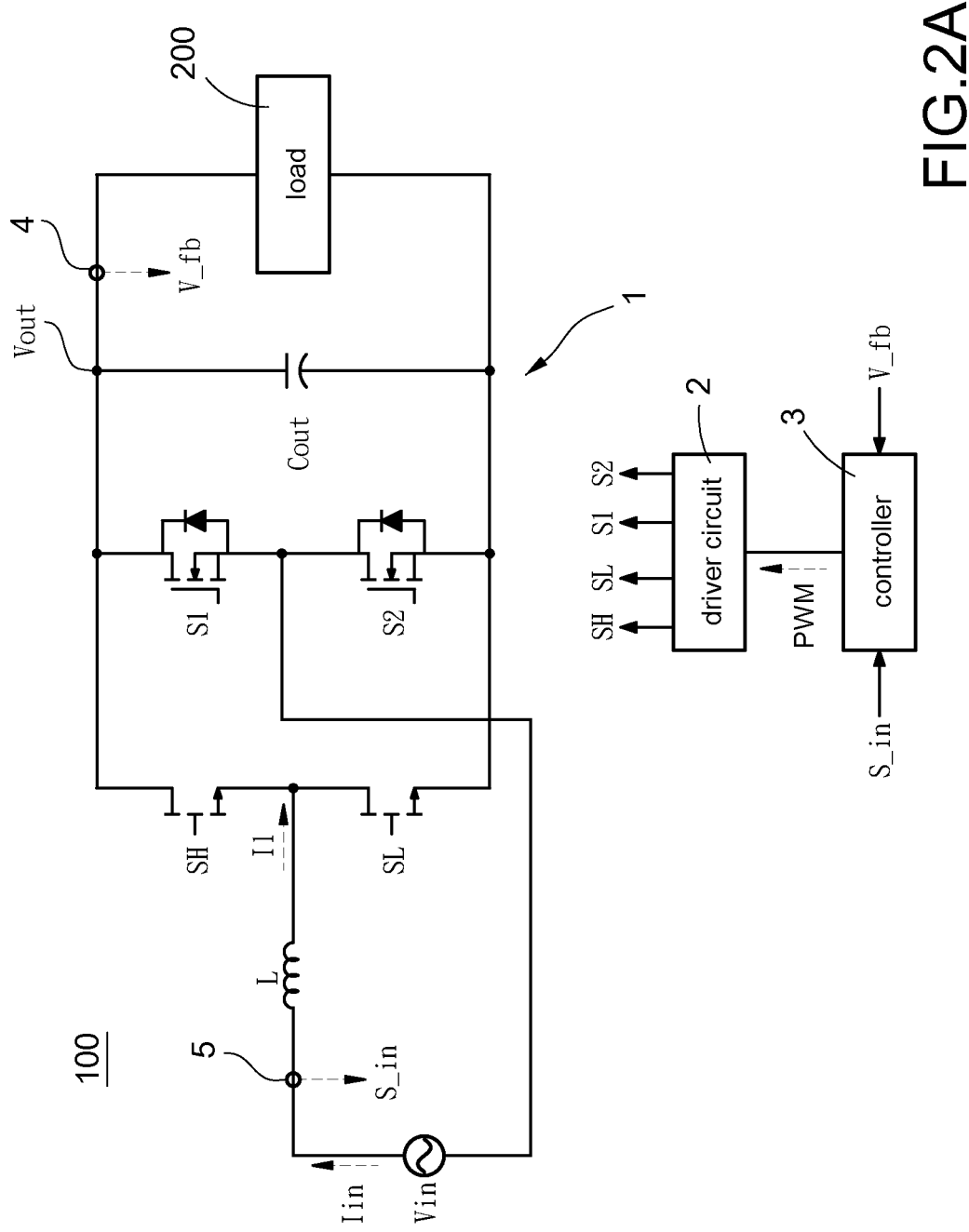
FIG. 2A is a block circuit diagram of a power converter with reduced power consumption according to the present disclosure.

Please refer to FIG. 2A, which shows a block circuit diagram of a power converter with reduced power consumption according to the present disclosure, and also refer to FIG. 1. The power converter 100 receives an input voltage Vin and provides an output voltage Vout to supply power to a load 200. The power converter 100 includes a power factor correction circuit 1, a driver circuit 2, and a controller 3. The power factor correction circuit 1 includes at least one inductor L, at least one power switch (SH, SL, S1, S2), and an output capacitor Cout. Take the circuit structure of FIG. 2A as an example, the inductor L is connected to an input end of the power factor correction circuit 1 to receive the input voltage Vin. The output capacitor Cout is connected to an output end of the power factor correction circuit 1 and coupled to the load 200 to provide the output voltage Vout to supply power to the load 200. The power switches (SH, SL, S1, S2) are coupled between the inductor L and the output capacitor Cout, and the driver circuit 2 is coupled between the controller 3 and the power switches (SH, SL, S1, S2).

The power converter 100 further includes an output detection circuit 4 and an input detection circuit 5. The output detection circuit 4 is coupled between the output capacitor Cout and the controller 3, and the input detection circuit 5 is coupled between the input end of the power factor correction circuit 1 and the controller 3. The output detection circuit 4 detects the output voltage Vout to provide a feedback voltage V_fb corresponding to the output voltage Vout to the controller 3. The input detection circuit 5 detects the input voltage Vin and an input current Iin at the input end of the power factor correction circuit 1 to provide an input signal S_in corresponding to the input voltage Vin and the input current Iin to the controller 3. The controller 3 modulates a pulse-width modulation (PWM) signal PWM based on the feedback voltage V_fb and the input signal S_in, and provides the PWM signal PWM to the driver circuit 2.

The driver circuit 2 receives the PWM signal PWM and drives the switching of turning on and turning off the power switches (SH, SL, S1, S2). Therefore, the driver circuit 2 can switch the power switches (SH, SL, S1, S2) based on the PWM signal PWM to control the power factor correction circuit 1 to convert the input voltage Vin into the output voltage Vout, and control the input current Iin of the power factor correction circuit 1 to follow the input voltage Vin. Incidentally, the circuit structure of the power factor correction circuit 1 shown in FIG. 2A is only a schematic example. The power factor correction circuit 1 may use different circuit structures according to the requirements of the power converter 100. Therefore, any AC/DC conversion circuit that can be used as the power factor correction circuit 1 should be included in the scope of the present embodiment, and the detail description is omitted here for conciseness.

Figure 2B:
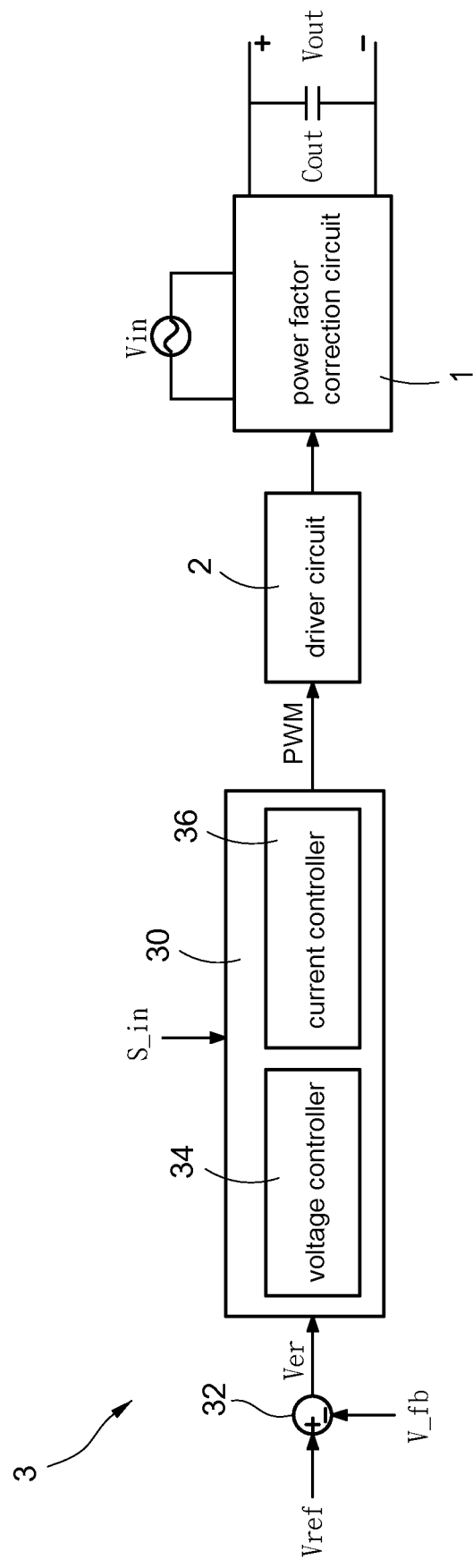
FIG. 2B is a block circuit diagram of a controller according to the present disclosure.

Please refer to FIG. 2B, which shows a block circuit diagram of a controller according to the present disclosure, and also refer to FIG. 2A. The controller 3 includes an error amplifier 32 and a control module 30. The control module 30 includes a voltage controller 34 and a current controller 36. The error amplifier 32 is coupled to the output capacitor Cout through the output detection circuit 4 to receive the feedback voltage V_fb corresponding to the output voltage Vout. The error amplifier 32 generates an error signal Ver based on the feedback voltage V_fb and the reference voltage Vref, and the control module 30 is coupled to the error amplifier 32 to receive the error signal Ver. The control module 30 generates the PWM signal PWM based on the error signal Ver and the input signal S_in, and the voltage controller 34 and the current controller 36 are used to calculate the switching frequency of the power switches (SH, SL, S1, S2) and limit/adjust the switching frequency, thereby correspondingly generating the PWM signal PWM.

Furthermore, since the switching frequency of the input current control method of the critical conduction mode (CRM) and that of the triangular current mode (TCM) belong to the variable frequency control, both the input voltage Vin and the input current Iin are a time function vac (ωt) of the instantaneous value of the input voltage Vin and a time function iac (ωt) of the instantaneous value of the input current Iin. In other words, under a fixed load (corresponding to the effective value of the fixed input current Iin), the instantaneous values of the input voltage Vin at different mains voltage angles, the required switching frequencies of the power switches (SH, SL, S1, S2) are not the same. The specific value of the switching frequency may be acquired by calculating the instantaneous values of the input voltage Vin, the output voltage Vout, the inductance of the inductor L, and the instantaneous value of the input current Iin through the calculations of the voltage controller 34 and the current controller 36. Incidentally, TCM needs to additionally consider parasitic capacitances Coss of the power switches (SH, SL, S1, S2). For example, under a fixed load condition, the angles of the input voltage Vin are 90 degrees and 45 degrees, and the switching frequencies are different. In particular, the switching frequency range of the control method of CRM and TCM may be from several kHz to several MHz (for example, but not limited to, 30 kHz to 3 MHz).

Figure 3A:
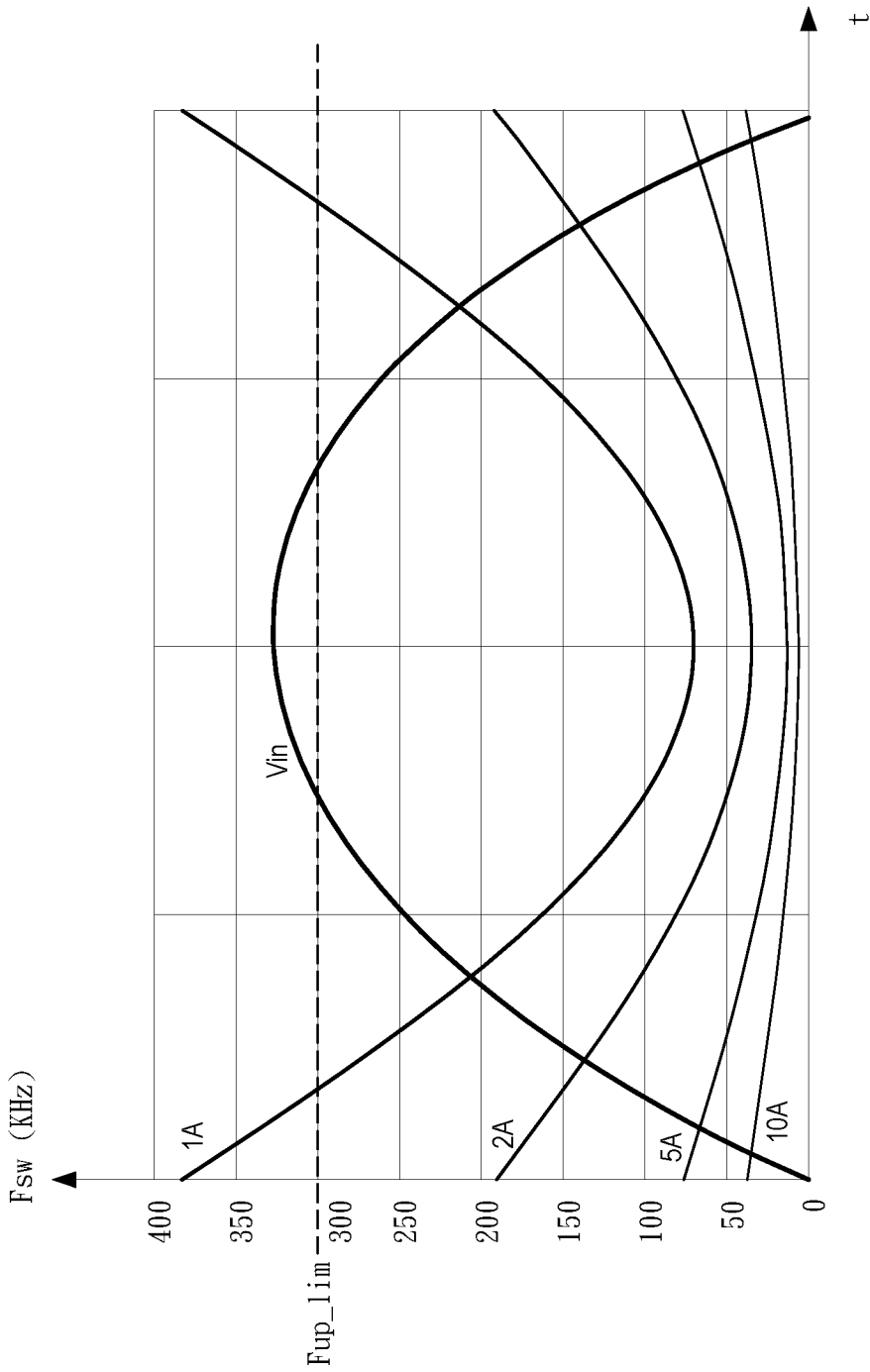
FIG. 3A is a schematic curve diagram of switching frequency of the power converter operating in a critical conduction mode according to the present disclosure.
Figure 3B:
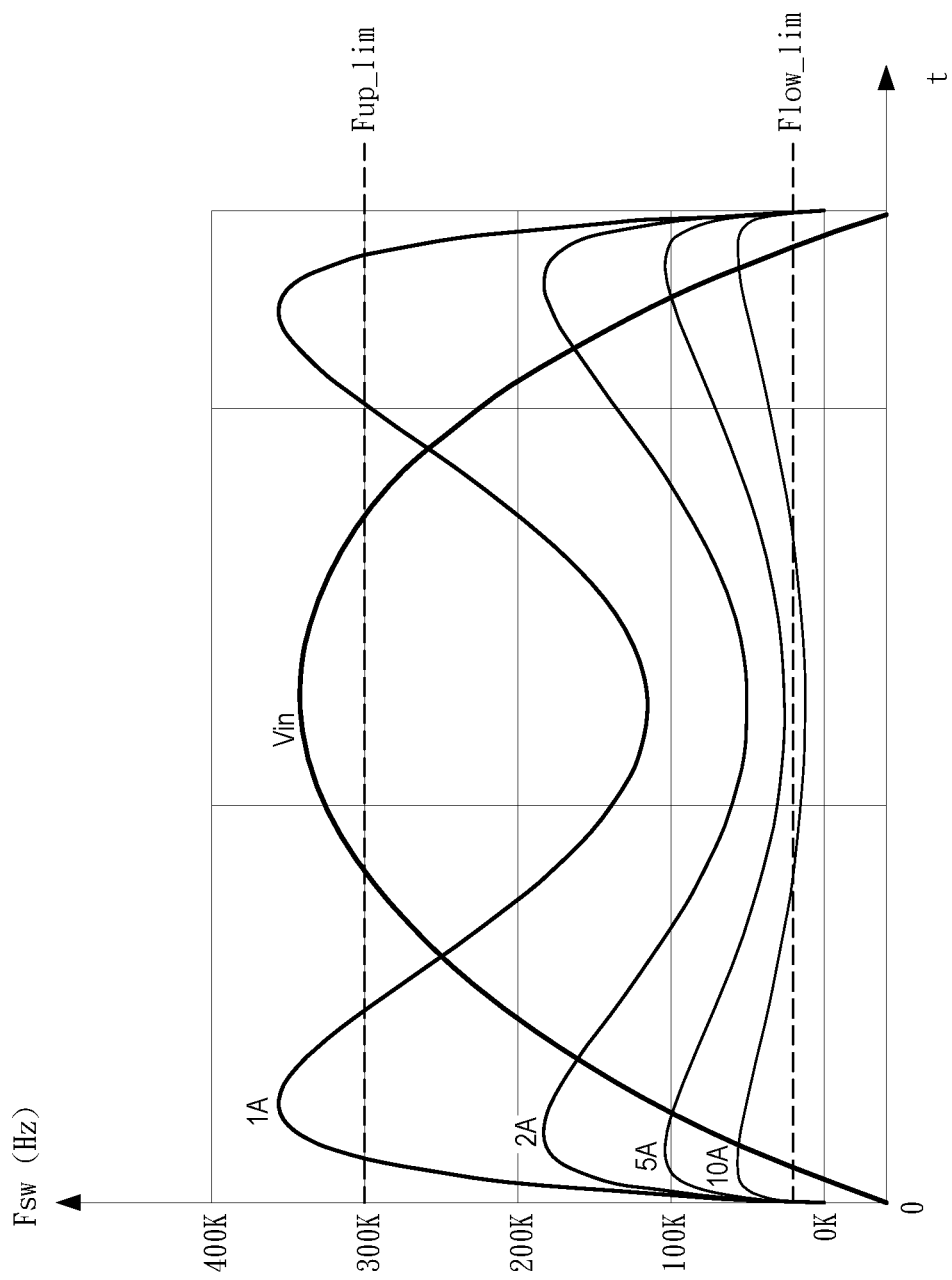
FIG. 3B is a schematic curve diagram of switching frequency of the power converter operating in a triangular current mode according to the present disclosure.

Please refer to FIG. 3A, which shows a schematic curve diagram of switching frequency of the power converter operating in a critical conduction mode according to the present disclosure; please refer to FIG. 3B, which shows a schematic curve diagram of switching frequency of the power converter operating in a triangular current mode according to the present disclosure, and also refer to FIG. 2A and FIG. 2B. The controller 3 can mainly operate the power factor correction circuit 1 in CRM and TCM, the reason is that the input current control mode of CRM and TCM, and also operating at high switching frequency, compared with the input current control method of continuous conduction mode (CCM), it has the advantage of smaller conduction (turned-on) loss.

For the input current control mode of CRM, when the input voltage Vin is less than 1/2 of the output voltage Vin, the power switches (SH, SL, S1, S2) operate at zero-voltage switching (ZVS) by switching the power switches (SH, SL, S1, S2) of fast-switching legs. When the input voltage Vin is greater than 1/2 of the output voltage Vin, the power switches (SH, SL, S1, S2) can be turned on when the drain-source voltage Vds of the power switch is at the valley, thereby reducing the conduction (turned-on) loss. In addition, for the input current control mode of TCM, at any phase angle of the input voltage Vin, the power switches (SH, SL, S1, S2) of the fast-switching legs can be operated at ZVS.

Furthermore, in FIG. 3A, the power converter 100 operates at the switching frequency Fsw of the CRM as a smile curve. In the half-wave of the input voltage Vin, when the load is light (that is, the corresponding effective value of the input current Iin is lower, such as but not limited to 1 Amp), the smile curve is higher, and vice versa. This means that the lower the effective value of the input current Iin, the higher the switching frequency Fsw, and vice versa. In particular, the switching frequency Fsw is higher when the angle of the input voltage Vin is close to the zero-crossing point, and is lower when the angle of the input voltage Vin is close to 90 degrees. Therefore, the switching frequency Fsw operating in the CRM is determined by the controller 3 according to the instantaneous value of the input voltage Vin and the instantaneous value of the input current Iin, and the switching frequencies Fsw at different points are different.

On the other hand, in FIG. 3A, the controller 3 further sets a maximum frequency Fup_lim, and the maximum frequency Fup_lim usually refers to the upper limit of the hardware design of the power converter 100. Specifically, each power converter 100 must set the maximum frequency Fup_lim according to the design of internal components (such as but not limited to the inductance of the inductor L, etc.) and the specifications of the controller 3. When the maximum frequency Fup_lim is exceeded, it usually exceeds the upper limit that the controller 3 can control, causing the power converter 100 to run out of control and become abnormal. Especially, when the angle of the input voltage Vin is close to the zero-crossing point and the load is light (such as but not limited to 1 Amp), the switching frequency Fsw has reached 400 kHz, which will inevitably exceed the upper limit that the controller 3 can control, or will cause obstacles to the selection of the specifications of the controller 3.

In FIG. 3B, the switching frequency Fsw of the power converter 100 operating in TCM is an M-shaped curve. Similarly, in the half-wave of the input voltage Vin, when the load is light (that is, when the effective value of the corresponding input current Iin is lower, such as but not limited to 1 Amp), the M-shaped curve is higher, and vice versa. However, when the angle of the input voltage Vin is close to the zero-crossing point, the switching frequency Fsw is extremely low. As the angle of the input voltage Vin gradually deviates from the zero-crossing point, the switching frequency Fsw abruptly increases, and when the angle of the input voltage Vin approaches 90 degrees, the switching frequency Fsw gradually decreases. Similarly, the switching frequency Fsw operating in the TCM is determined by the controller 3 according to the instantaneous value of the input voltage Vin and the instantaneous value of the input current Iin, and the switching frequency Fsw at different points are different.

On the other hand, in FIG. 3B, in addition to setting the maximum frequency Fup_lim, the controller 3 additionally sets a minimum frequency Flow_lim, and the minimum frequency Flow_lim generally refers to the lower limit of the frequency at which the power converter 100 can operate. Specifically, in the operation of the TCM, when the angle of the input voltage Vin is close to the zero-crossing point, the calculated switching frequency Fsw is extremely low (such as but not limited to less than 1 kHz). A too low switching frequency Fsw may cause the switching speed of the control power switches (SH, SL, S1, S2) to be too slow, causing the angle of the input voltage Vin to deviate from the zero-crossing point, but the switching speed is too slow to respond, which causes the power converter 100 to run out of control and become abnormal.

Figure 4A:
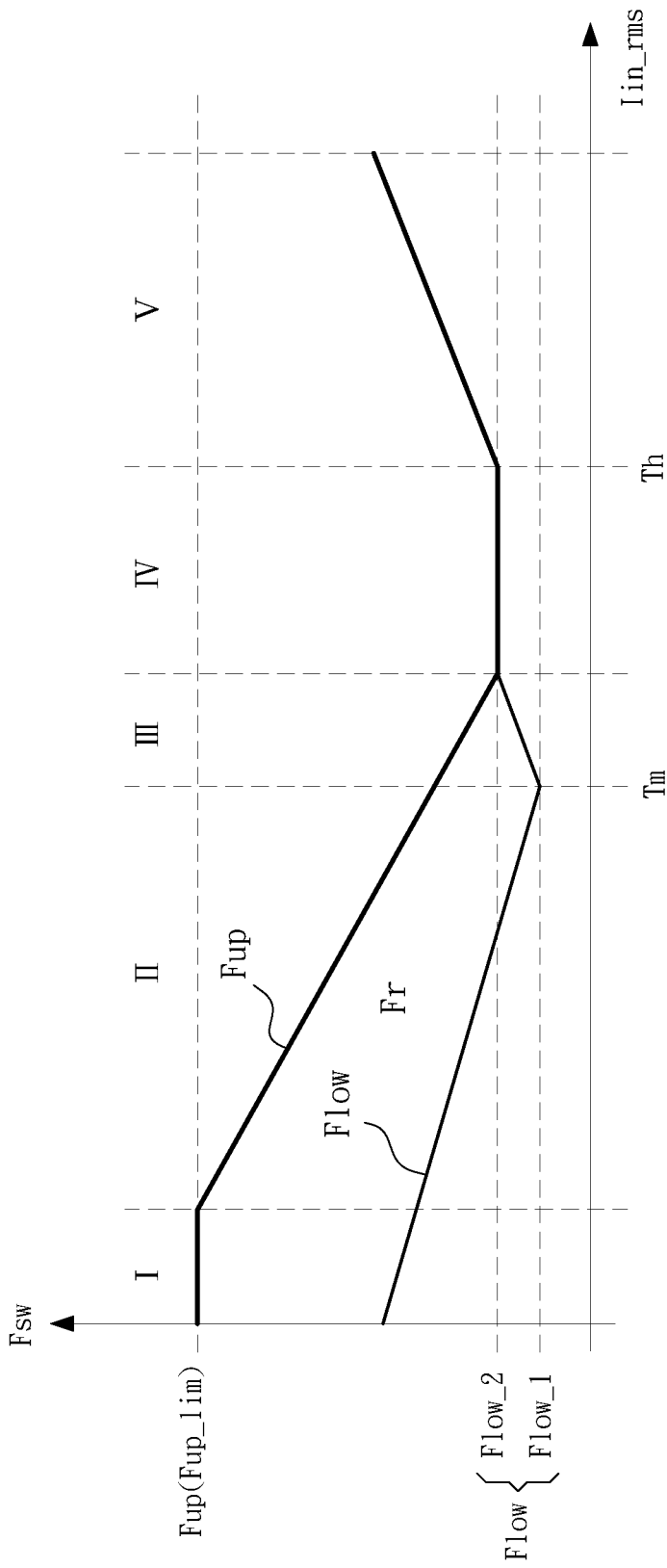
FIG. 4A is a schematic diagram of the frequency operation range of switching frequency of the power converter operating in the critical conduction mode according to the present disclosure.

Please refer to FIG. 4A, which is a schematic diagram of the frequency operation range of switching frequency of the power converter operating in the critical conduction mode according to the present disclosure, and also refer to FIG. 2A to FIG. 3A. The controller 3 acquires the frequency range based on the effective value Iin_rms of the input current Iin, and the frequency range Fr includes an upper limit frequency Fup and a lower limit frequency Flow. The upper limit frequency Fup and the lower limit frequency Flow are mainly composed of the smile curve in FIG. 3A, the magnitude of the input current Iin (expressed in effective value) may correspond to each interval (interval I to interval V) in FIG. 4A, and the magnitude of the input current Iin may also correspond to the (loading of the) load 200. When the load 200 is in no-load condition or light-load condition, the effective value Iin_rms of the input current Iin is relatively low (such as but not limited to interval I), otherwise (in heavy-load condition) it is high (such as but not limited to interval V). The controller 3 also acquires the switching frequency Fsw based on the instantaneous value of the input voltage Vin, and confirms whether the switching frequency Fsw falls within the frequency range Fr. In particular, the instantaneous value of the input voltage Vin and the effective value Iin_rms of the input current Iin may be acquired by receiving, by the controller 3, the input signal S_in provided by the input detection circuit 5.

When the load 200 is in no-load condition or light-load condition, the controller 3 operates the power converter 100 in the interval I. Due to the characteristics of the CRM under a fixed load, the calculated switching frequency Fsw may exceed the limitation of the maximum frequency Fup_lim of the hardware bandwidth so that the controller 3 sets the upper limit frequency Fup to the maximum frequency Fup_lim. When the calculated switching frequency Fsw exceeds the predetermined upper limit frequency Fup, it operates at a fixed frequency (that is, the upper limit frequency Fup is equal to the maximum frequency Fup_lim), and switches the operation mode of the power factor correction circuit 1 from CRM to CCM. Therefore, when the power converter 100 operates in the interval I, and the switching frequency Fsw calculated by the controller 3 exceeds the predetermined upper limit frequency Fup, the controller 3 switches the operation mode of the power factor correction circuit 1 to CCM, and the switching frequency Fsw is set as fixed frequency.

On the contrary, if the calculated switching frequency Fsw does not exceed the predetermined upper limit frequency Fup, the controller 3 switches the operation mode of the power factor correction circuit 1 to the CRM mode, and the switching frequency Fsw is switched according to the results calculated by the controller 3 (that is, the variable-frequency operation). In particular, since the switching frequency Fsw of the power converter 100 operating on the CRM is the smile curve, and even if the switching frequency Fsw in the interval I is lower, it will not be less than the minimum frequency Flow_lim of the hardware bandwidth. Therefore, the lower limit frequency Flow is not the minimum frequency Flow_lim of the hardware bandwidth in the interval I.

When the load gradually increases so that the effective value Iin_rms of the input current Iin leaves the interval I, it means that the load 200 becomes heavier and enters the interval II. The switching frequency Fsw calculated by the controller 3 is no longer greater than the maximum frequency Fup_lim, and the bottom of the smile curve (i.e., the lower limit frequency Flow) will not touch the minimum frequency Flow_lim. Therefore, the controller 3 sets the operation mode of the power factor correction circuit 1 to CRM, and the switching frequency Fsw is modulated (i.e., frequency variation) according to the calculations of the controller 3. Until the effective value Iin_rms of the input current Iin reaches a medium load threshold Tm, the controller 3 controls the power factor correction circuit 1 operating in the variable-frequency CRM. In interval I and interval II, the higher the effective value Iin_rms is, the lower the upper limit frequency Fup and the lower limit frequency Flow are, and therefore the effective value Iin_rms is negatively correlated with the upper limit frequency Fup and the lower limit frequency Flow.

When the controller 3 determines that the load gradually increases so that the effective value Iin_rms rises to the medium load threshold Tm, it enters the interval III. In the interval III, the switching frequency Fsw calculated by the controller 3 based on the instantaneous value of the input voltage Vin. If it is less than the lower limit frequency Flow, the controller 3 switches the operation mode of the power factor correction circuit 1 from CRM to CCM, and limits the switching frequency Fsw to the fixed frequency (i.e., the lower limit frequency Flow). In particular, the lower limit frequency Flow may be the frequency calculated by the current effective value Iin_rms (i.e., the minimum of the lower limit frequency Flow), or it may be the minimum frequency Flow_lim of the hardware bandwidth set by the controller 3, or a frequency value predetermined by the controller 3. Certainly, the maximum frequency Fup_lim of the interval III may also be a frequency value predetermined by the controller 3.

When the controller 3 determines that the load gradually increases from the medium load threshold Tm, the controller 3 increases the lower limit frequency Flow from a first lower limit frequency Flow_1 to a second lower limit frequency Flow_2 based on the increase of the effective value Iin_rms. On the contrary, the controller 3 adjusts the lower limit frequency Flow from the second lower limit frequency Flow_2 to the first lower limit frequency Flow_1 based on the decrease of the effective value Iin_rms. Therefore, based on the increase of the effective value Iin_rms, the frequency at which the power factor correction circuit 1 enters CCM gradually increases from the first lower limit frequency Flow_1 to the second lower limit frequency Flow_2. Therefore, as the load increases, the lower limit value of the switching frequency Fsw will also increase as the load increases. When the switching frequencies Fsw calculated by the controller 3 falls within the frequency range Fr, the controller 3 switches the operation mode of the power factor correction circuit 1 to CRM, otherwise, switches to CCM.

When the controller 3 determines that the load gradually increases from the medium load threshold Tm, and the upper limit frequency Fup decreases and the lower limit frequency Flow increases, the upper limit frequency Fup is equal to the lower limit frequency Flow (i.e., the second lower limit frequency Flow 2), it enters the interval IV. Since the decrease of the upper limit frequency Fup and the increase of the lower limit frequency Flow will inevitably make the two curves touch so that the frequency range Fr no longer exists in the interval IV. Therefore, after the interval IV, the switching frequency Fsw completely departs from CRM and enters CCM with the fixed frequency (fixed at the second lower limit frequency Flow 2), until the effective value Iin_rms rises to a heavy load threshold Th.

When the controller 3 determines that the effective value Iin_rms is greater than the heavy load threshold Th, it enters the interval V. The controller 3 still fixes the switching frequency Fsw at the second lower limit frequency Flow 2, but the controller 3 adjusts the second lower limit frequency Flow_2 based on the magnitude of the effective value Iin_rms. Specifically, when entering the interval V, the controller 3 increases the second lower limit frequency Flow_2 based on the increase of the effective value Iin_rms, and otherwise decreases the second lower limit frequency Flow_2. Therefore, in the interval V, the magnitude of the effective value Iin_rms is positively correlated with the second lower limit frequency Flow 2, and as the load increases, the second lower limit frequency Flow_2 also increases as the load increases. In one embodiment, the medium load threshold Tm and the heavy load threshold Th can be designed according to circuit parameters of the power factor correction circuit 1 (such as but not limited to the input voltage Vin, the inductance of the inductor L, etc.), and the thresholds may be adjusted according to user's requirements.

On the other hand, due to this fixed frequency operation, and the second lower limit frequency Flow_2 is adjusted with the magnitude of the effective value Iin_rms. When operating under the fixed load, the adjustment of the input voltage Vin causes the effective value Iin_rms and the switching frequency Fsw to change accordingly. Since the change of the input voltage Vin affects the input current Iin, the controller 3 adjusts the effective value Iin_rms based on the input voltage Vin, and then changes the switching frequency Fsw. Specifically, when the input voltage Vin increases, the controller 3 decreases the effective value Iin_rms, resulting in the decrease of the switching frequency Fsw. On the contrary, the effective value Iin_rms increases accordingly, resulting in the increase of the switching frequency Fsw so that the input voltage Vin is negatively correlated with the switching frequency Fsw and the effective value Iin_rms.

Figure 4B:
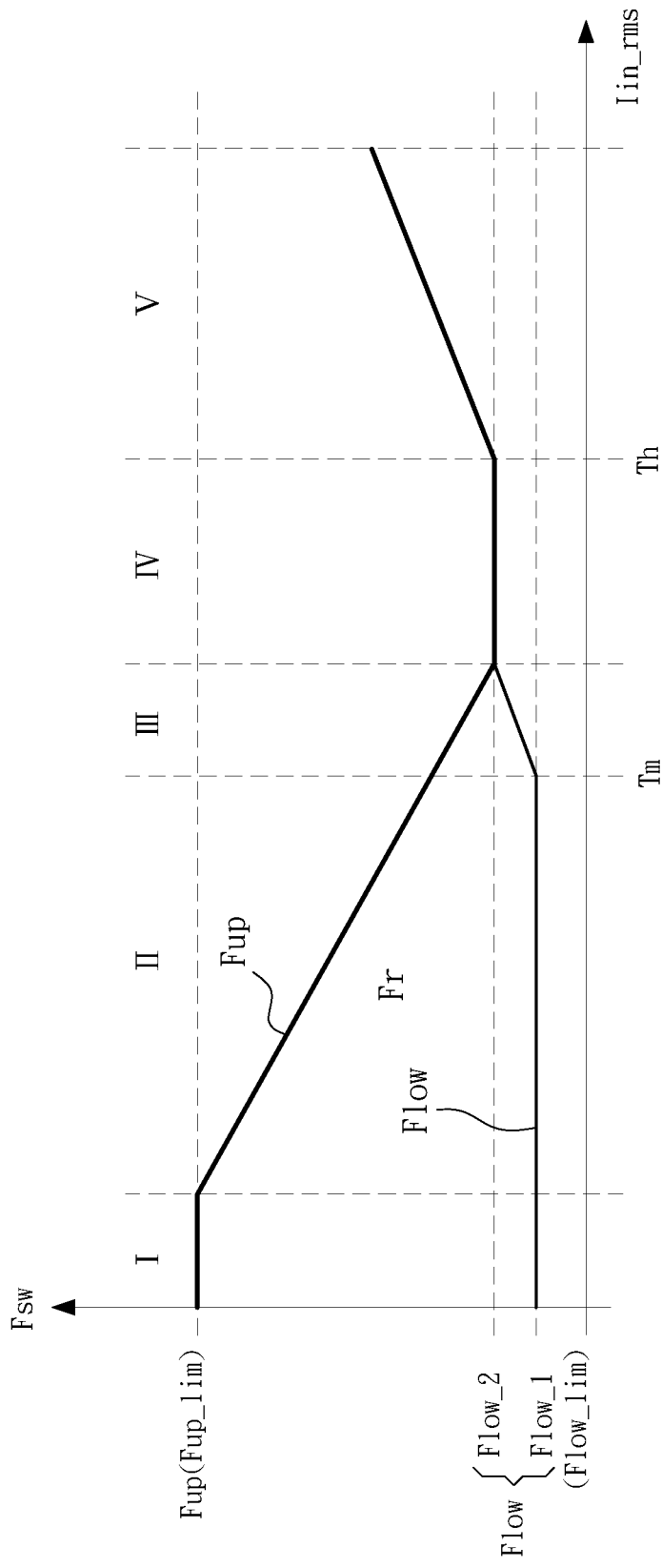
FIG. 4B is a schematic diagram of the frequency operation range of switching frequency of the power converter operating in the triangular current mode according to the present disclosure.

Please refer to FIG. 4B, which shows a schematic diagram of the frequency operation range of switching frequency of the power converter operating in the triangular current mode according to the present disclosure, and also refer to FIG. 2A to FIG. 4A. The difference between the operation interval of TCM shown in FIG. 4B and that shown in FIG. 4A is: when the effective value Iin_rms is lower than the medium load threshold Tm, the controller 3 sets the lower limit frequency Flow to the fixed frequency. Also refer to FIG. 3B, since the angle of the input voltage Vin is close to the zero-crossing point in TCM and the calculated switching frequency Fsw is very low (such as but not limited to less than 1 kHz), a fixed lower limit frequency Flow must be predetermined. It is similar to FIG. 4A, the lower limit frequency Flow may be the frequency calculated by the current effective value Iin_rms (i.e., the minimum of the lower limit frequency Flow), or it may be the minimum frequency Flow_lim of the hardware bandwidth set by the controller 3, or a frequency value predetermined by the controller 3.

When the switching frequency Fsw calculated by the controller 3 falls within the frequency range Fr, the controller 3 switches the operation mode of the power factor correction circuit 1 to TCM, otherwise, switches to CCM. Therefore, in the interval I, when the switching frequency Fsw calculated by the controller 3 exceeds the predetermined maximum frequency Fup_lim or the lower limit frequency Flow, the controller 3 switches the operation mode of the power factor correction circuit 1 to CCM, and the switching frequency Fsw is set to a fixed frequency (i.e., the maximum frequency Fup_lim or the lower limit frequency Flow). In the interval II, when the switching frequency Fsw calculated by the controller 3 is lower than the predetermined lower limit frequency Flow, the controller 3 switches the operation mode of the power factor correction circuit 1 to CCM, and the switching frequency Fsw is set to a fixed frequency (that is, the lower limit frequency Flow).

In the interval III, when the controller 3 determines that the load gradually increases and the effective value Iin_rms increases to the medium load threshold Tm, and the switching frequency Fsw calculated by the controller 3 based on the instantaneous value of the input voltage Vin is less than the lower limit frequency Flow, the controller 3 switches the operation mode of the power factor correction circuit 1 from TCM to CCM, and limits the switching frequency Fsw to the fixed frequency (i.e., the lower limit frequency Flow). The controller 3 increases the lower limit frequency Flow from the first lower limit frequency Flow_1 to the second lower limit frequency Flow_2 based on the increase of the effective value Iin_rms. Therefore, based on the increase of the effective value Iin_rms, the frequency at which the power factor correction circuit 1 enters CCM gradually increases from the first lower limit frequency Flow_1 to the second lower limit frequency Flow_2. Incidentally, the operation modes of the controller 3 not mentioned in FIG. 4B are the same as those in FIG. 4A, and the detail description is omitted here for conciseness.

Furthermore, the method of the present disclosure using TCM or CRM input current control is to solve the problem that the power switches (SH, SL, S1, S2) in high-power applications need to bear relatively large current stress. Usually, when operating in light-load condition, the switching frequency is high, and due to factors such as hardware bandwidth limitations, a maximum fixed operation frequency will be limited. On the contrary, when operating in heavy-load condition, the switching frequency is low, and in order to prevent the inductance L of the power factor correction circuit 1 from being saturated or reducing the current stress of the power switches (SH, SL, S1, S2), a minimum fixed operation frequency is limited. Therefore, in practical applications, when the iron core (Ae value) of the inductor L is selected, the required inductance/number of turns of the inductor L will then be determined. For higher circuit efficiency, the minimum operation frequency is usually limited to a lower frequency. The reasons are that: 1. the above two control methods can realize a wide range of ZVS load, 2. working in CCM can reduce the core loss of the inductor L when the load is heavy.

In addition, the rapid improvement in the performance of information industry equipment in recent years has spawned some more extreme applications. For example, 1.2 times the rated power cannot be protected, or the instantaneous output must bear nearly twice the power. Therefore, the steady state current and the transient current of the input current Iin of the power factor correction circuit 1 will become larger in these special applications. These conditions will easily cause the inductor current I1 to operate at a fixed minimum frequency for a long time, which will easily cause the inductor L to saturate.

The main purpose and effect of the present disclosure are, in order to retain the aforementioned advantages of increasing the power density per unit volume and high efficiency, and it is applied in the special environment where the load cannot be protected by 1.2 times the rated power, or the instantaneous output can withstand the power twice as fast, and avoid the phenomenon of saturation of the inductance L. The present disclosure proposes a technology that allows the operable range (load range) of the aforementioned two control methods to be changed widely so as to achieve the effect of changing the ZVS load range widely.

As described in interval III of FIG. 4A and FIG. 4B, when the controller determines that the effective value Iin_rms is higher than the medium load threshold Tm, the operation mode of the power factor correction circuit 1 is switched from CRM or TCM to CCM based on the switching frequency Fsw being less than the lower limit frequency Flow, and the switching frequency Fsw is limited to the lower limit frequency Flow. Moreover, the controller 3 increases the lower limit frequency Flow from the first lower limit frequency Flow_1 to the second lower limit frequency Flow_2 based on the increase of the effective value Iin_rms. Therefore, the operation range (load range) may be changed to a wider range, and the inductance saturation phenomenon caused by the long-term operation of the inductor current at a fixed minimum frequency can be avoided, thereby realizing the effect of widening the ZVS load range.

Figure 5:
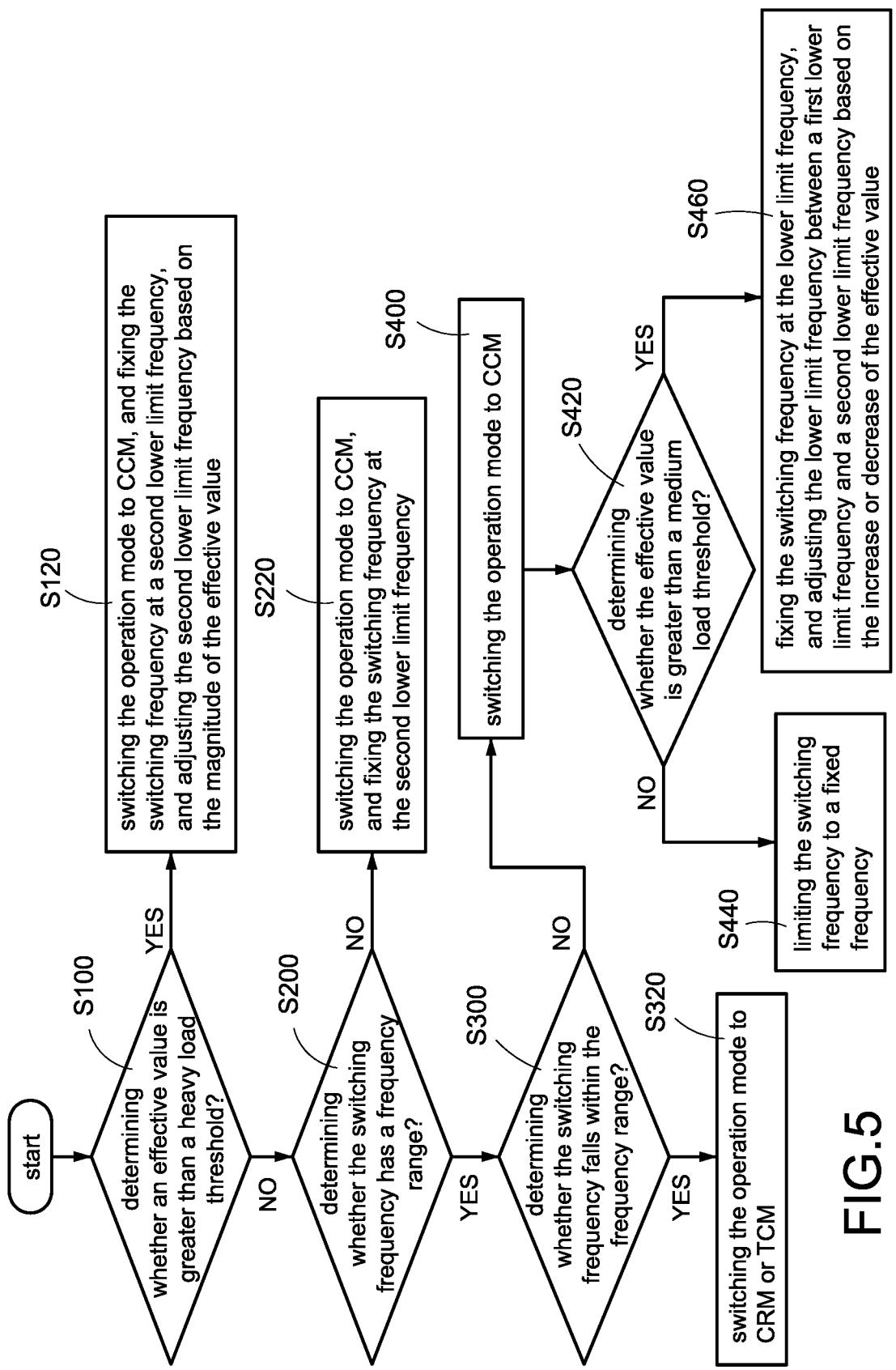
FIG. 5 is a flowchart of a method of operating the power converter according to the present disclosure.

Please refer to FIG. 5, which shows a flowchart of a method of operating the power converter according to the present disclosure, and also refer to FIG. 2A to FIG. 4B. The present disclosure mainly uses an operation method as shown in FIG. 4A and FIG. 4B to control the power factor correction circuit 1. When the switching frequency Fsw calculated by the controller 3 falls within the frequency range Fr, the controller 3 switches the operation mode of the power factor correction circuit 1 to CRM or TCM, and vice versa to CCM. Also, according to the interval in which the effective value Iin_rms of the input current Iin falls, the CCM is set to a fixed frequency or the switching frequency Fsw is adjusted with the change of the effective value Iin_rms. Therefore, the method of operating the power converter 100 includes steps of: determining whether the effective value is greater than the heavy load threshold (S100). If the determination result in step (S100) is "YES", switching the operation mode of the power factor correction circuit 1 to CCM, and fixing the switching frequency at the second lower limit frequency, and adjusting the second lower limit frequency based on the magnitude of the effective value (S120). On the contrary, determining whether the switching frequency has a frequency range (S200). If the determination result in step (S200) is "NO", switching the operation mode of the power factor correction circuit 1 to CCM, and fixing the switching frequency at the second lower limit frequency (S220).

If the determination result in step (S200) is "YES", determining whether the switching frequency falls within the frequency range (S300). If the determination result in step (S300) is "YES", switching the operation mode of the power factor correction circuit 1 to CRM or TCM (S320) so that the switching frequency Fsw is adjusted by the controller 3. On the contrary, switching the operation mode of the power factor correction circuit 1 to CCM (S400) and determining whether the effective value is greater than the medium load threshold (S420). If the determination result in step (S420) is "NO", limiting the switching frequency to the fixed frequency (i.e., the upper limit frequency Fup or the lower limit frequency Flow) (S440). On the contrary, fixing the switching frequency at the lower limit frequency, and adjusting the lower limit frequency between the first lower limit frequency and the second lower limit frequency based on the increase or decrease of the effective value (S460). Incidentally, the process steps not described in FIG. 5 may be referred to in conjunction with FIG. 4A and FIG. 4B, and will not be repeated here.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power converter, configured to receive an input voltage, and provide an output voltage to supply power to a load, the power converter comprising:
    a power factor correction circuit, configured to receive the input voltage, and comprising at least one power switch, and
    a controller, coupled to the at least one power switch, and configured to control the switching of the at least one power switch, and control the power factor correction circuit converting the input voltage into the output voltage, and control an input current of the power factor correction circuit to follow the input voltage,
    wherein the controller acquires a switching frequency and a frequency range based on an instantaneous value of the input voltage and an effective value of the input current, wherein the frequency range comprises an upper limit frequency and a lower limit frequency;
    when the controller determines that the effective value is greater than a medium load threshold, an operation mode of the power factor correction circuit is switched from a critical conduction mode to a continuous conduction mode, and to limit the switching frequency to the lower limit frequency based on the switching frequency being less than the lower limit frequency; or the operation mode is switched from a triangular current mode to the continuous conduction mode, and to limit the switching frequency to the lower limit frequency,
    wherein when the controller determines that the effective value is greater than the medium load threshold, the controller adjusts the lower limit frequency between a first lower limit frequency and a second lower limit frequency based on the increasing or decreasing of the effective value.

2. The power converter as claimed in claim 1, wherein when the controller determines that the switching frequency is greater than the upper limit frequency, the operation mode is switched to the continuous conduction mode, and to limit the switching frequency to the upper limit frequency.

3. The power converter as claimed in claim 1, wherein when the controller determines that the switching frequency is within the frequency range, the controller sets the operation mode to the critical conduction mode or the triangular current mode.

4. The power converter as claimed in claim 1, wherein when the controller determines that the effective value is less than the medium load threshold and the operation mode is the critical conduction mode, the controller sets the lower limit frequency is negatively correlated with the effective value.

5. The power converter as claimed in claim 1, wherein when the controller determines that the effective value is less than the medium load threshold and the operation mode is the triangular current mode, the controller sets the lower limit frequency to a fixed frequency.

6. The power converter as claimed in claim 1, wherein when the controller determines that the effective value is less than a heavy load threshold and the upper limit frequency is equal to the second lower limit frequency, the operation mode is switched to the continuous conduction mode, and to limit the switching frequency to the second lower limit frequency.

7. The power converter as claimed in claim 6, wherein when the controller determines that the effective value is greater than the heavy load threshold, the controller adjusts the second lower limit frequency based on the effective value and sets the effective value is positively correlated with the second lower limit frequency.

8. The power converter as claimed in claim 7, wherein the controller adjusts the switching frequency and the effective value based on the input voltage and sets the switching frequency and the effective value is negatively correlated with the input voltage.

9. The power converter as claimed in claim 1, wherein the controller comprises:
    an error amplifier, coupled to an output end of the power factor correction circuit, and generates an error signal based on the output voltage and a reference voltage, and
    a control module, coupled to the error amplifier, and generates a pulse-width modulation signal based on the error signal and an input signal, wherein the pulse-width modulation signal is configured to control the switching of the at least one power switch,
    wherein the input signal comprises the input voltage and the input current, and the control modules acquires the instantaneous value and the effective value based on the input signal.

10. A method of operating a power converter, the power converter configured to receive an input voltage and provide an output voltage to supply power to a load; the power converter comprising a power factor correction circuit and the power factor correction circuit comprising at least one power switch; the method comprising steps of:
acquiring a switching frequency and a frequency range based on an instantaneous value of the input voltage and an effective value of an input current of the power factor correction circuit, wherein the frequency range comprises an upper limit frequency and a lower limit frequency;
determining the switching frequency based on the effective value being greater than a medium load threshold;
(a) switching an operation mode of the power factor correction circuit from a critical conduction mode to a continuous conduction mode based on the switching frequency being less than the lower limit frequency, and limiting the switching frequency to the lower limit frequency, or
(b) switching the operation mode from a triangular current mode to the continuous conduction mode based on the switching frequency being less than the lower limit frequency, and limiting the switching frequency to the lower limit frequency;
increasing the lower limit frequency from a first lower limit frequency to a second lower limit frequency based on the increase of the effective value, and
decreasing the lower limit frequency from the second lower limit frequency to the first lower limit frequency based on the decrease of the effective value.

11. The method of operating the power converter as claimed in claim 10, further comprising steps of:
determining that the switching frequency is greater than the upper limit frequency, and
switching the operation mode to the continuous conduction mode, and limiting the switching frequency to the upper limit frequency.

12. The method of operating the power converter as claimed in claim 10, further comprising steps of:
determining that the switching frequency is within the frequency range, and
setting the operation mode to the critical conduction mode or the triangular current mode.

13. The method of operating the power converter as claimed in claim 10, further comprising steps of:
(a1) determining that the effective value is less than the medium load threshold and the operation mode is the critical conduction mode, and
(a2) setting the lower limit frequency is negatively correlated with the effective value.

14. The method of operating the power converter as claimed in claim 10, further comprising steps of:
(b1) determining that the effective value is less than the medium load threshold and the operation mode is the triangular current mode, and
(b2) setting the lower limit frequency to a fixed frequency.

15. The method of operating the power converter as claimed in claim 10, further comprising steps of:
determining that the effective value is less than a heavy load threshold and the upper limit frequency is equal to the second lower limit frequency, and
switching the operation mode to the continuous conduction mode, and limiting the switching frequency to the second lower limit frequency.

16. The method of operating the power converter as claimed in claim 15, further comprising steps of:
determining that the effective value is greater than the heavy load threshold, and
adjusting the second lower limit frequency based on the effective value and setting the effective value is positively correlated with the second lower limit frequency.

17. The method of operating the power converter as claimed in claim 16, further comprising a step of:
adjusting the switching frequency and the effective value based on the input voltage and setting the switching frequency and the effective value is negatively correlated with the input voltage.

18. The method of operating the power converter as claimed in claim 10, further comprising steps of:
generating an error signal based on the output voltage and a reference voltage,
generating a pulse-width modulation signal of controlling the at least one switch based on the error signal and an input signal, and
acquiring the instantaneous value and the effective value based on the input signal to calculate the switching frequency, the upper limit frequency, and the lower limit frequency.

* * * * *